(12) United States Patent
Vu

(10) Patent No.: US 7,071,447 B2
(45) Date of Patent: Jul. 4, 2006

(54) AUTOMOBILE COFFEE MAKER

(76) Inventor: Nghia Ngo Vu, 5118 Vera La., San Jose, CA (US) 95111

(*) Notice: Subject to any disclaimer, the term of this patent is extended or adjusted under 35 U.S.C. 154(b) by 0 days.

(21) Appl. No.: 10/993,074

(22) Filed: Nov. 17, 2004

(65) Prior Publication Data

US 2005/0103771 A1    May 19, 2005

Related U.S. Application Data

(63) Continuation-in-part of application No. 10/612,509, filed on Jul. 3, 2003, now abandoned.

(51) Int. Cl.
*F23Q 7/22* (2006.01)
(52) U.S. Cl. .................. 219/270; 219/213
(58) Field of Classification Search ............ 392/441, 392/444
See application file for complete search history.

(56) References Cited

U.S. PATENT DOCUMENTS

| | | | |
|---|---|---|---|
| 3,998,143 A * | 12/1976 | Frye | 99/280 |
| 4,095,090 A * | 6/1978 | Pianezza | 219/441 |
| 4,495,404 A * | 1/1985 | Carmichael | 392/447 |
| 6,625,393 B1 * | 9/2003 | Eller et al. | 392/489 |

* cited by examiner

*Primary Examiner*—Thor S. Campbell
(74) *Attorney, Agent, or Firm*—Squire, Sanders & Dempsey L.L.P.

(57) ABSTRACT

The 12 Volts DC powered cooker to be installed by the vehicle's manufacturers or the vehicle's owner. The unit will heat liquid temperature to 100° C. and will switch off at temperature greater than 100° C. The switching and temperature monitoring is controlled by an electronic unit. The electronic controlled unit that switches on the heating glow plug to heat liquid to 100° C. and switches off when the liquid is above 100 C. A safety switch also turn the heating glow plug off when the temperature exceeds 200 C. or when the unit is not in an upright position.

17 Claims, 5 Drawing Sheets

AUTOMOBILE COFFEE MAKER

CROSS-REFERENCE TO RELATED APPLICATIONS

This application is a continuation-in-part of the application filed by Nghia Ngo Vu having the Ser. No. 10/612,509, and the filing date of Jul. 3, 2003 now abandoned.

BACKGROUND OF THE INVENTION

1. Field of the Invention

Every automobile has one battery with a capacity from 600 amperes to 1000 amperes which are stored in the form of chemical energy in battery's cells. This chemical energy will be covert to electrical energy to supply current for a starter to crank its engine and supply current to electric components to operate the vehicle. When vehicle is operating, an alternator is power by the engine pulley. The alternator will generate a current at a rate 40 of amperes to 150 amperes to supply current for all electric components in the vehicle and recharge electrical energy back to the battery. Every automobile has an electrical energy source that can be used to help driver to make a cup of hot water to prepare instant coffee, to warm up food and or heat 16 oz of water. To help drivers, the automotive coffee maker relates to a 12 volts DC electric cooker which being installed in vehicle by vehicle's manufacture or vehicle's owner. The power source of the unit being connected to negative polarity and positive polarity of the battery. This automotive coffee cooker is used to convert electrical energy from battery and alternator to electrical power. This electrical power is used to boil a small amount 16 ounces of liquid or food in a removable stainless steel cup.

2. Discription of the Prior Art

Various devices have been produced for making coffee in automobile such as device is shown in U.S. Pat. No. 3,813,517. This unit comprised of a housing chamber, an electrical heating element and wires with alligator clips.

The new automobile coffee maker (application Ser. No. 10/612,509) has its own surface housing cooker with a removable stainless steel cup, and two glow plugs which operates as electrical heating elements and an electronic control unit.

U.S. Pat. No. 5,377,581 which is comprised of a base plate constituting, a water tank and the electrical resistance wire worked as electrical heating element. This new patent application is not taught by the present invention.

U.S. Pat. No. 3,998,143, filed by Helen G. Frye comprised of a container with three heating elements. It has a simple circuit and a mechanical timer-switch. A battery at the bottom of the container make its weight to be 60 pounds resulting in a large and heavy unit.

The new automotive coffee maker (application Ser. No. 10/612,509) has two electrical heating elements which had U.S. Pat. No. 6,667,463. The electrical heating elements name Ceramic sheathed element glow plug, (CSEGP) have been mounted on diesel engine to support the combustion in the combustion chamber of diesel engine.

This (CSEGP) has a pellet with power heating element can carry high current without thermal destroy. In 8 second the temperature of the glow plug will be at 800° C. and will be at 1200° C. after 60 seconds. The new automotive coffee maker (application Ser. No. 10/612,509) also has a new electronic control unit, its electronic components are fabricated on a PC board. The electronic control unit automatically control two glow plugs on and off to maintain the surface housing cooker at a temperature of 100° C.

Advantage of this Invention.

1. The new automotive coffee maker (application Ser. No. 10/612,509) has two glow plugs which can draw a maximum 40 Amperes when glow plugs are cold or it can draw 30 Amperes when glow plugs are hot.

$P=V I$ with V=12 volts, I=30 Amperes or $P=(12)(30)=360$ Watts.

Where

P is power in unit of Watts.

I is current in unit of Amperes.

V is voltage in unit of volts.

According to formula, two glow plugs will generate 360 Watts, the surface housing cooker will conduct heat to the stainless steel cup, to raise the temperature of liquid in stainless steel to 100° C. in five minutes.

2. The new automotive coffee maker (application Ser. No. 10/612,509) has an integrated circuit LM 555N, manufactured by National semiconductor, the circuit LM555N includes 23 transistors, 2 diodes, and 16 resistors are fabricated on a silicon chip. Installed in a 8-pin mini dual-in-line package. It can be pre-program for generating accurate time delay from microseconds through hours by one external resistor and capacitor.

3. The new automotive coffee maker (application Ser. No. 10/612,509) has an integrated circuit IFR 510, manufactured of International Rectifier. It contain a metal-oxide-semiconductor with three pins name Gate, Source, Drain.

This 12 volts DC electric cooker making the invention a safer device, very efficient, sealable unit, high-tech to serve driver.

SUMMARY OF THE INVENTION

The new automotive coffee maker (application Ser. No. 10/612,5090) provides a high-tech 12 volts DC electric cooker, with a power source being connected direct to the battery terminals by the vehicle's manufacture or vehicle's owner.

Heating elements are two glow plugs produced by draws more current to convert electrical energy to electrical power, in a shorter time.

The electronic control unit has pre-programmed functions that switches the time delay on, when time is expired it turn off the relay. Automatically, which remove current from two glow plugs. The electronic control unit automatically turn off the relay move the current from two glow plugs when the unit is heated to 200° C. or when the vehicle is not in operational mode.

The surface housing cooker, with a greater surface area, is wrapped around the stainless steel cup, resulting in a greater rate at which heat is conducted to the stainless steel cup. This result in a shorter cooking time. The stainless steel cup works as a cooking pot and a cup to serve. Its small size and low weight of four pounds provide a safe and suitable unit to be install near the driver seat.

The electric cooker is used to boil 16 oz. of water to prepare coffee and/or to heat food or to cook a small amount of food.

BRIEF DESCRIPTION OF DRAWINGS

The invention will be better understood by five figures.

DETAILED DESCRIPTION OF THE INVENTION

Figure 1:
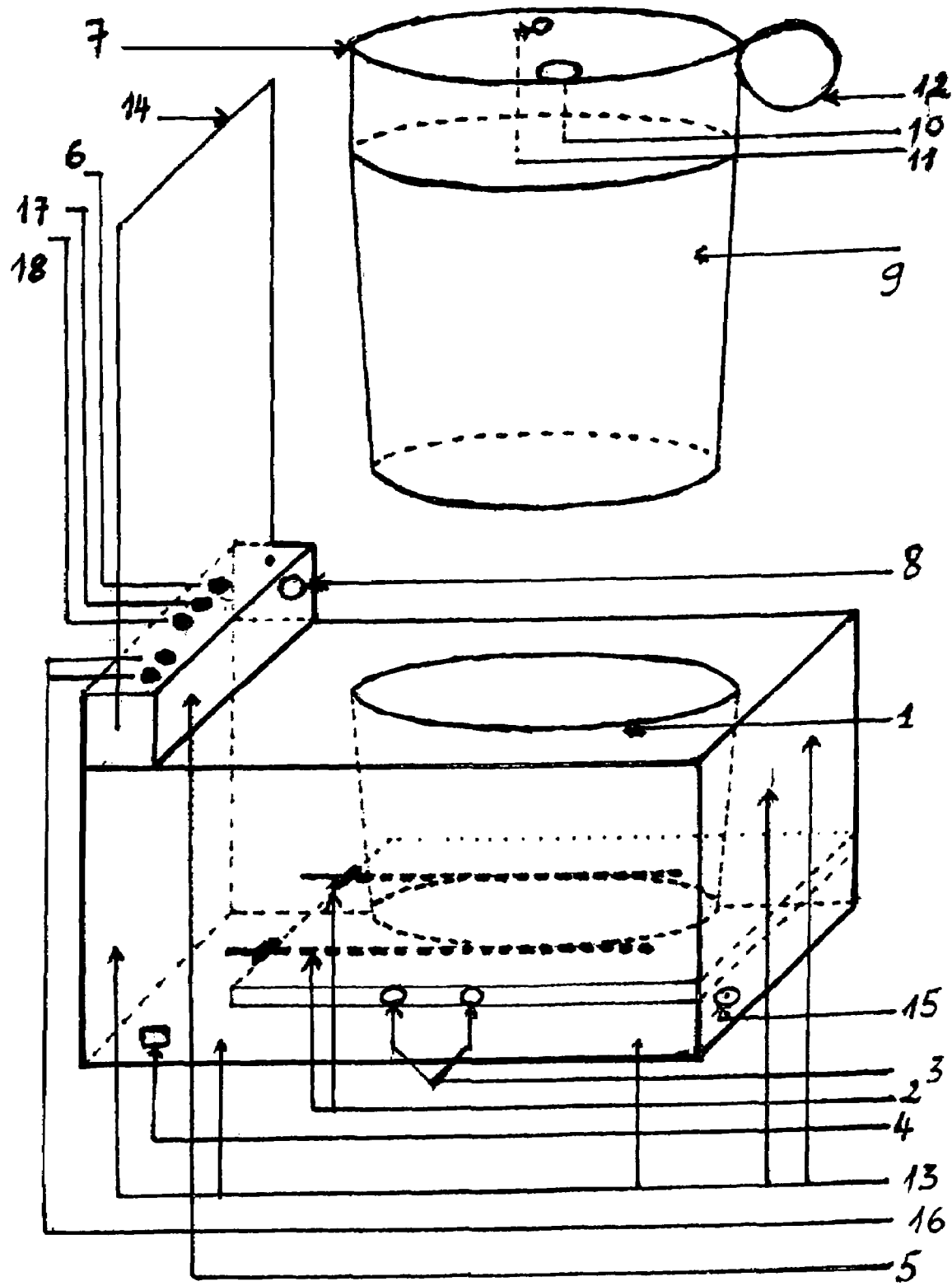
FIG. 1. Shows the electric cooker unit with the top cap open, the stainless steel cup, and the surface housing cooker which is located inside a metal container.

The electric cooker unit with its components in FIG. 1. The unit comprised a small metal container, its size: 5 inches wide, 6 inches high, and 7 inches length, with four side covers and a bottom cover 13 in FIG. 1.

Figure 4:
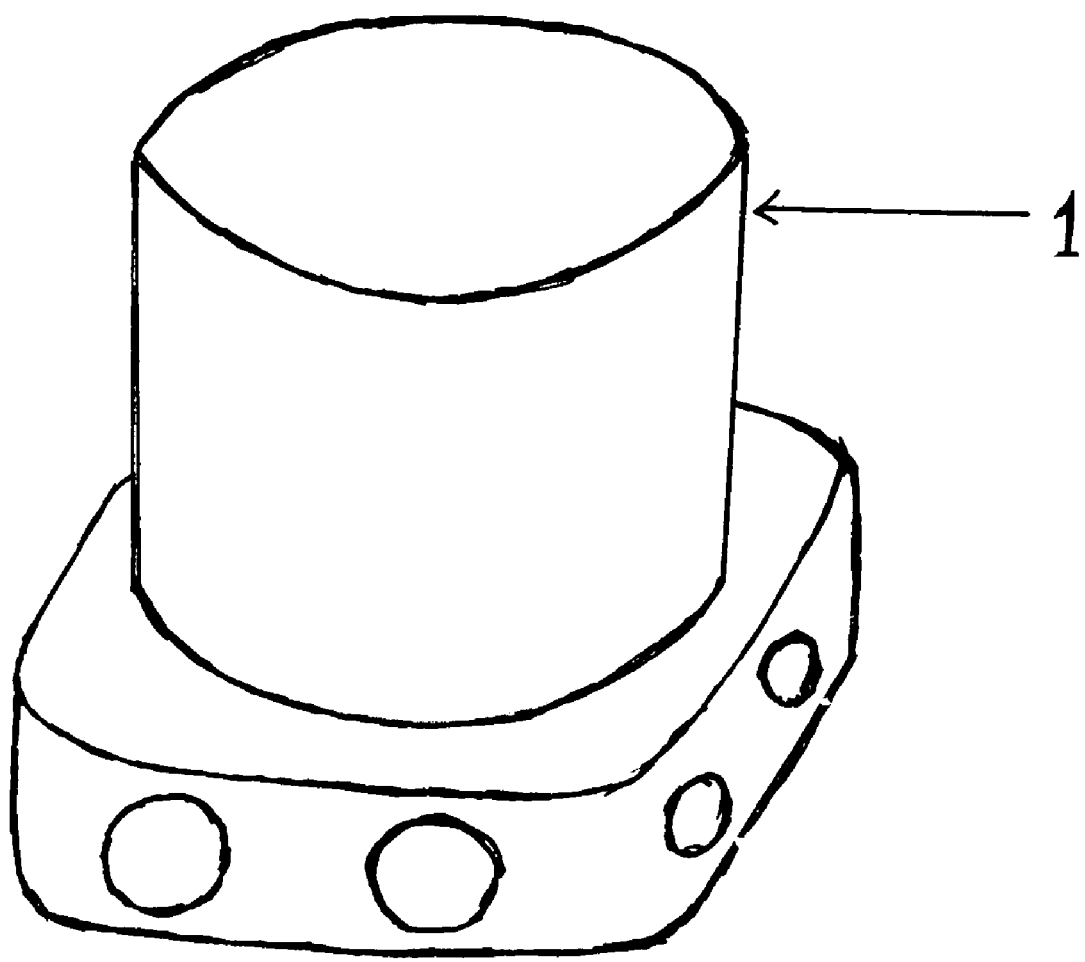
FIG. 4. Shows the housing cooker unit with 2 female fittings of glow plugs and 2 female fittings of temperature switches.
Figure 5:
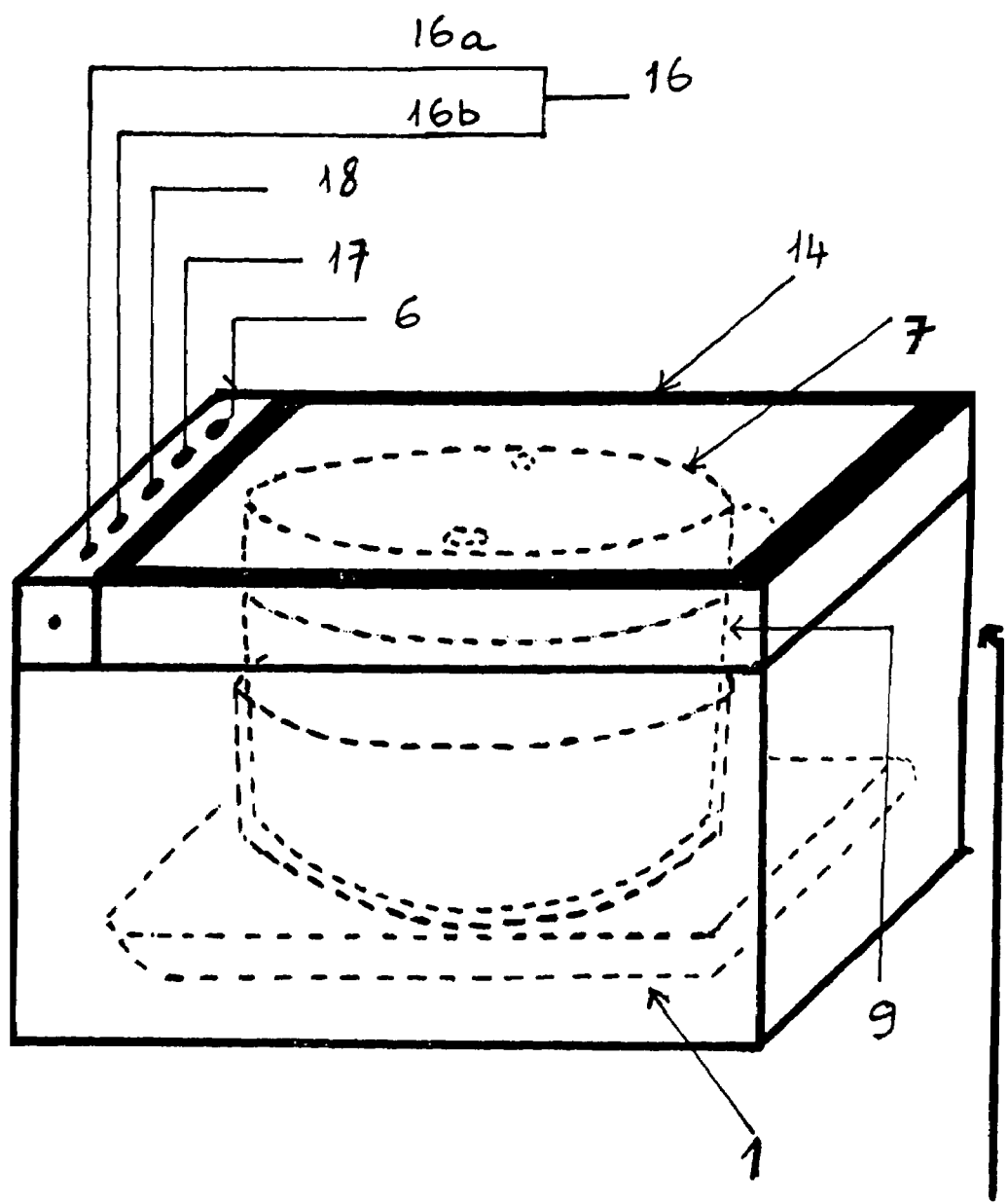
FIG. 5. The unit electric cooker with the cup in its housing cooker.

A safety cap cover 14 in FIG. 1 is on the top side of the whole unit, this metal container has a surface housing cooker unit 1 in FIG. 1 being mounted inside the metal container, the base of surface housing cooker will be mounted on the bottom side of the metal container with four ceramic stands to prevent heat transfer to metal container. The surface housing cooker 1 in FIG. 1 is made of die-cast aluminum alloy. It has a square bottom and cylindrical wall, which is wrapped around the stainless steel cup 9 in FIG. 1. The bottom and the wall form one unit, the bottom is 0.65 inch thick, on the front side, it has two female pre-thread holes which hold two glow plugs 2 in FIG. 4 in place, on other side, it has two female pre-thread holes which hold two temperature switches 3 in FIG. 4, one temperature switch 3a in FIG. 2 is 100° C. temperature switch which is used for maintaining surface cooker at 100° C. by self closing its contacts if the surface housing cooker under 100° C. and open its contacts if the surface housing cooker above 100° C., this temperature switch 3a in FIG. 2 has its contacts are normal closed, its two terminals connect in series with safety door switch 8 in FIG. 2 and the coil of 12 volts SPST relay 25 in FIG. 2.

Figure 2:
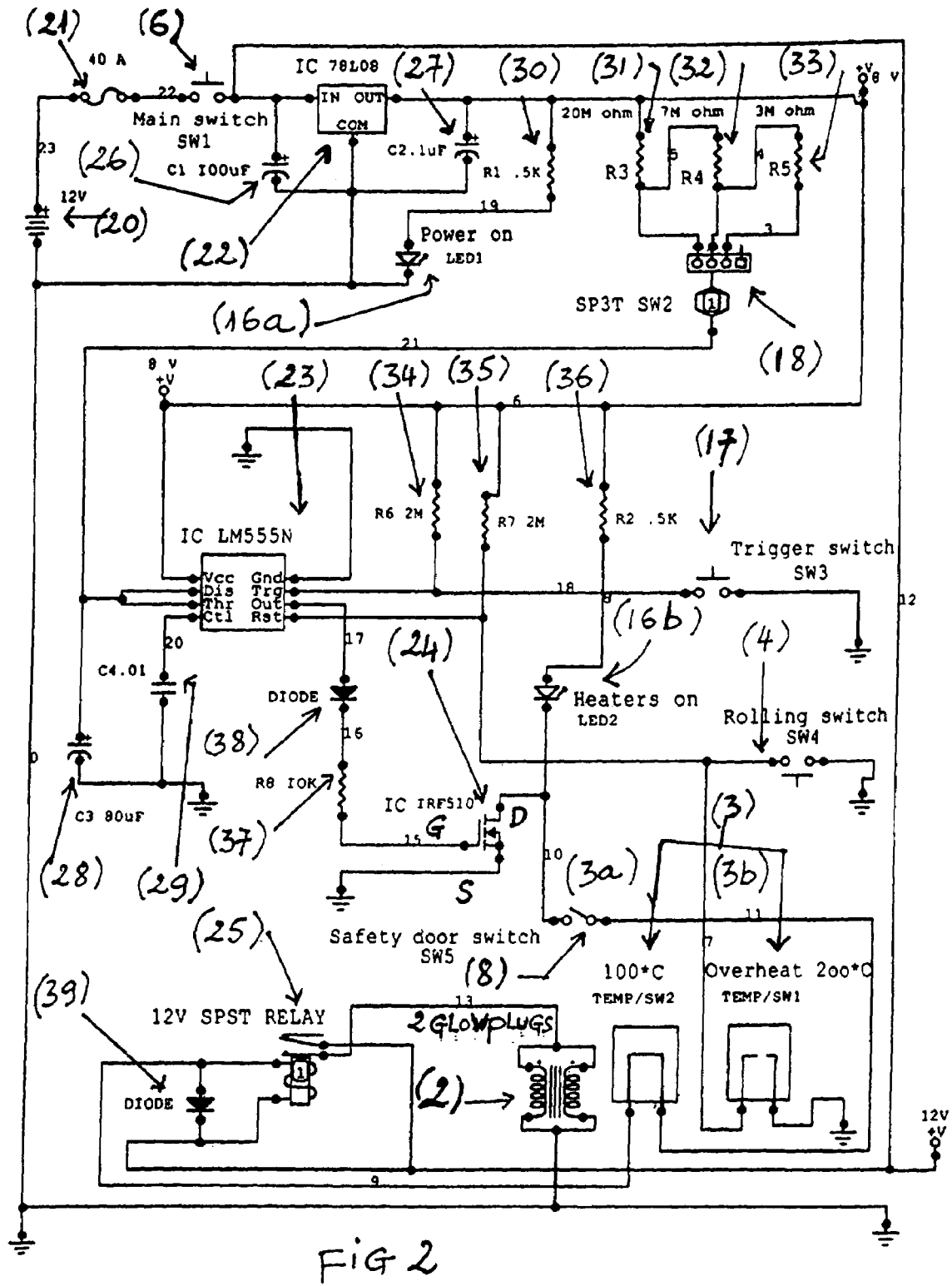
FIG. 2. The main schematic illustration of all electronic components.

Another temperature switch 3b in FIG. 2 is 200° C. temperature switch which has its contacts are normal open and one end terminal of temperature switch connects to pin reset or pin number 4 of IC LM 555N 23 in FIG. 2 and other end terminal of temperature switch connects to ground, its contacts will closed when the temperature is over heat at 200° C., IC LM555N 25 automatically turn off two glow plugs for the safety.

A rolling switch 4 in FIG. 2 is a liquid mercury switch; its contacts are normally in the open position and are mounted at bottom of the metal container, if vehicle is rolled over, IC LM555N 25 turn off two glow plugs.

A PC board 5 in FIG. 1 is mounted under the main control penal, electrical components are fabricated on a PC board 5 in the PC board has a voltage regulator IC 78L08 22 in FIG. 2.

A timer IC LM555N 23 in FIG. 2.

A N channel Mosfet IC IRF 510 24 in FIG. 2.

8 resistors in FIG. 2: R1=0.5 K ohm, R2=0.5 k ohm, R3=20M ohm, R4=7M ohm, R5=3M ohm, R6=2M ohm, R7=2M ohm, R8=10K ohm.

Figure 3:
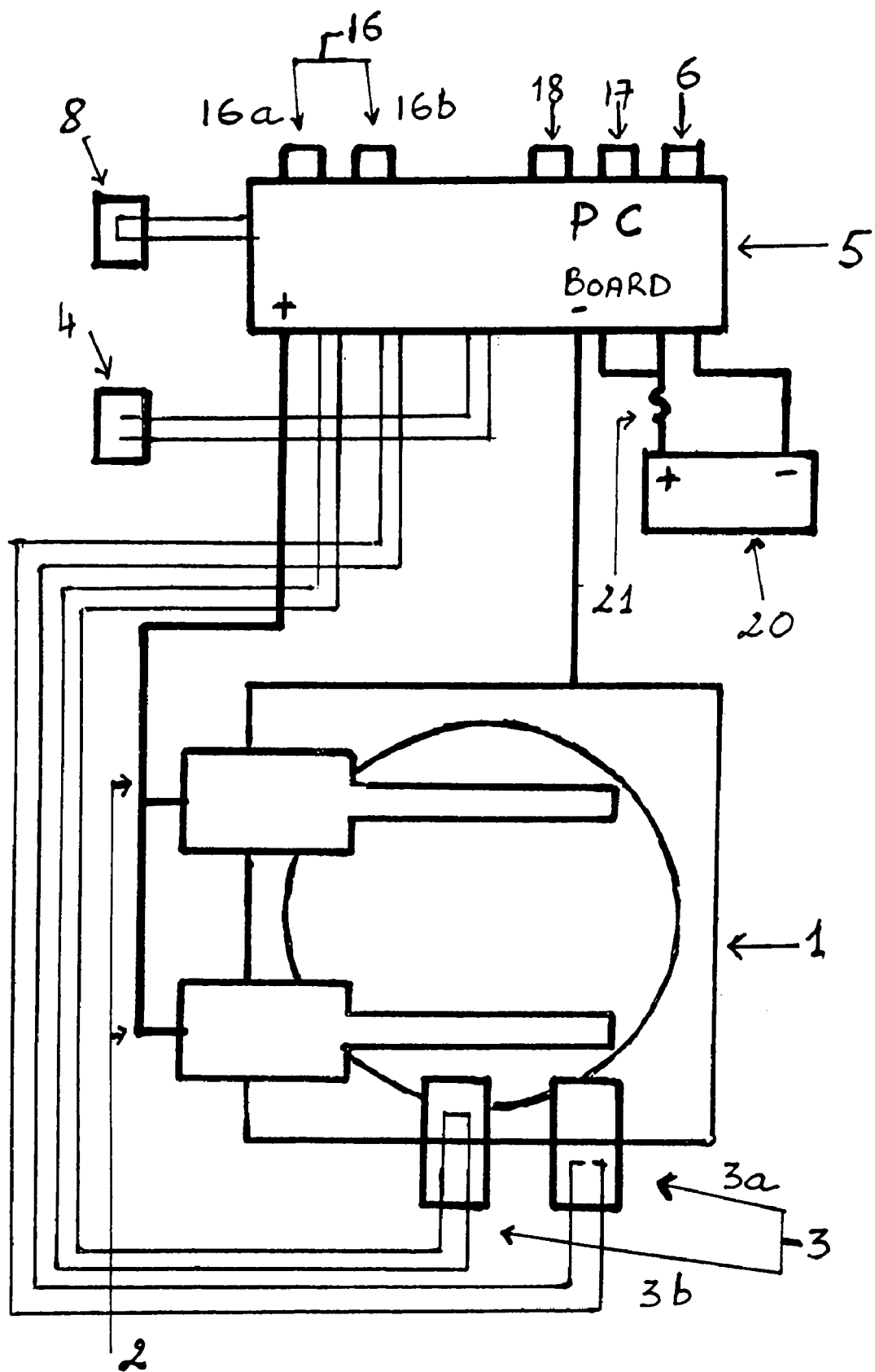
FIG. 3. The top view of the circuit scheme for connection of the surface cooker and the PC board.

Two LEDs 16 in FIG. 3, one in green color 16a in FIG. 3 another in red color 16b in FIG. 3.

Two diodes 1N914 38 and 39 in FIG. 2 used to protect circuit.

Four capacitors: C1 26 in FIG. 2 is electrolytic capacitor, its value is 1.00 uF, C2 27 in FIG. 2 is electrolytic capacitor its value is 0.01 uF, C3 29 in FIG. 2 is monolithic ceramic capacitor, its value is 0.01 uF, C4 28 in FIG. 2 is tantalum capacitor its value is 80 uF.

A 12 volts SPST relay 25 in FIG. 2.

Main switch 6 in FIG. 2 has two positions, on and off.

Timer switch 18 in FIG. 2 is used for to select three pre-program time to cook.

Trigger switch 17 in FIG. 2 is a momentary switch, press the switch down then release, unit will start to cook.

A fuse 21 in FIG. 2 has a value is 40 Amperes.

The cap of the stainless steel cup 7 in FIG. 1 is to prevent spilling liquid in cup 9 in FIG. 1.

The cap is made by plastic with can endure high temperature, it has pre-screw to screw in top the stainless steel cup 9 in FIG. 1.

Safety door switch 8 in FIG. 1 is mounted under safety cap cover 14 in FIG. 1.

The safety door switch 8 in FIG. 2 is used to turn off the coil of relay 25 in FIG. 2, disconnect current from two glow plugs if the safety cap cover of the unit is opened.

A stainless steel cup 9 in FIG. 1 is used to conduct heat from the surface housing cooker 1 in FIG. 1 then continuous conduct heat to liquid or food in the cup 9 in FIG. 1.

On top the cap 7 in FIG. 1 has a small hole 10 in FIG. 1 is used for to drink and a small hole 11 in FIG. 1 used for to release steam from hot water.

A plastic handle 12 in FIG. 1 is located on a side of the stainless steel cup 9 in FIG. 1.

One cover side of the container 13 in FIG. 1 has a female DC 12 volts plug 15 in FIG. 1, it is used for quick install power to the unit from battery.

In FIG. 2 is the main schematic of the electric cooker unit which includes all electronic components they are connected together and function as they were designed and pre-program. The electronic controller is IC LM555N 22, it takes order by Trigger switch 17, when pin Trigger goes logic low or 0 volt, the IC LM555N 25 will start its functions by set logic high or 8 volts at pin Output, at the same time positive electrons will charge to C3 28, when voltage in C3 28 is reach ⅔ of 8 volts, the IC LM555N 25 will finish its function and set pin Output back to logic low or 0 volt.

During pin Output is logic high or 8 volts if rolling switch 4 or temperature switch 3b one or both being self connected to ground line, pin Reset of IC LM555N 23 goes logic low or 0 volt, the IC LM555N 25 will stop its functions by set logic low or 0 volt at pin Output.

Time can be set for delay cooking time by timer switch 18.

First selection, positive electrons will charge to C3 through R3 31.

This first selection will last for 7 minutes.

Second selection, positive electrons will charge to C3 through R3+R4 32.

This second selection will last for 12 minutes.

Third selection, positive electrons will charge to C3 through R3+R4+R5 33.

This third selection will last for 15 minutes.

The IC IRF 510 24, has three pin: Gate, Source, Drain Pin Source is connected to ground line, pin Gate is connected to pin Output of IC LM555N 25.

There is a temperature switch 3a and safety door switch 8 connect in series with pin Drain of IC IRF 510 24 and one coil terminal of relay 25.

There are two wires are connected to battery's terminals 20 one for positive polarity one for negative polarity, a main fuse 40 amperes 21 is connected in series with positive main line to protect shorting.

A main switch 6 is used for turn on power for PC board or the electronic control unit.

A voltage regulator IC 78L08 22 has three pins: IN pin, OUT pin, COM pin which are used to reduce 12 volts to 8 volts for electric control unit.

The IC LM555N 23 is a main IC of electronic controller unit in PC board, it has 8 pins: pin number 1 is Ground, pin number 2 is pin Trigger, pin number 3 is pin Output, pin number 4 is pin Reset, pin number 5 is pin Voltage control, pin number 6 is pin Threshold, pin number 7 is pin Discharge, pin number 8 is pin Voltage supply, its main function is automatically set pin Output logic high or 8 volts, when pin Trigger goes to logic low or 0 volt and this pin Output return to logic low or 0 volt when time is expired.

Relay 12 volt SPST 25 has four terminals, first terminal connects to alive 12 volts positive polarity, second terminal connects in series with temperature switch 3a in FIG. 2, third terminal connects to alive 12 volts positive polarity, fourth connects in series with two glow plugs.

In FIG. 3 is present more detailed of PC board 5, wirings are connected two glow plugs, two temperature switches 3a and 3b, safety door switch 8 rolling switch 4 ground line to the surface housing cooker and battery 20.

Green LED 16a in FIG. 2 will be on when main switch 6 is closed. Red LED 16b in FIG. 2 will be on when IC LM555N 25 starts its functions and self off when time is expired There is a fuse 40 Amperes 21 to protect short in unit.

Two glow plugs 2 in FIG. 2 have positive line connect to relay 25.

What is claimed is:

1. An apparatus for heating a human-consumable item, comprising:
    a receptacle configured to hold a cup of a consumable; and
    a cooker unit for receiving the receptacle, wherein the cooker unit has a square bottom and a cylindrical wall, the cooker unit including
        at least one ceramic sheathed glow plug, designed for use in a diesel engine, adjacent the receptacle configured to heat the cup, wherein the glow plug has a pellet with a power heating element, and wherein the glow plug is designed to reach a temperature of 800° C. in eight seconds and a temperature of 1200° C. after sixty seconds.

2. The apparatus of claim 1, wherein the heating element includes a coil.

3. The apparatus of claim 1, further comprising a control unit capable of shutting off the at least one glow plug when the temperature exceeds 200° Celsius.

4. The apparatus of claim 1, further comprising a control unit capable of shutting off the at least one glow plug when a vehicle in which the apparatus is installed in is not in an operational mode.

5. The apparatus of claim 1, further comprising a control unit capable of shutting off the at least one glow plug when the apparatus is not upright.

6. The apparatus of claim 5, wherein the control unit comprises a liquid mercury switch.

7. The apparatus of claim 1, wherein the item includes a food or a liquid.

8. The apparatus of claim 1, further comprising a safety door switch capable of turning off the at least one glow plug if a safety cap of the apparatus is opened.

9. The apparatus of claim 1, further comprising a control unit capable of shutting off the at least one glow plug when the temperature exceeds 100° Celsius.

10. A method for heating a human-consumable item, comprising:
    providing an apparatus having
        a receptacle configured to hold a cup of a consumable, and
        a cooker unit for receiving the receptacle, wherein the cooker unit has a square bottom and a cylindrical wall, the cooker unit including
            at least one ceramic sheathed glow plug, designed for use in a diesel engine, adjacent the receptacle configured to heat the cup; and
    activating the at least one glow plug,
    wherein the glow plug has a pellet with a power heating element, and wherein the glow plug is designed to reach a temperature of 800° C. in eight seconds and a temperature of 1200° C. after sixty seconds.

11. The method of claim 10, further comprising shutting off the at least one glow plug when the temperature exceeds 200° Celsius.

12. The method of claim 10, further comprising shutting off the at least one glow plug when a vehicle in which the apparatus is installed is not in an operational mode.

13. The method of claim 10, further comprising shutting off the at least one glow plug when the apparatus is not upright.

14. The method of claim 10, wherein the item includes a food or a liquid.

15. The method of claim 10, further comprising turning off the at least one glow plug if a safety cap of the apparatus is opened.

16. The method of claim 10, further comprising shutting off the at least one glow plug when the temperature exceeds 100° Celsius.

17. The method of claim 10, wherein the heating element includes a coil.

* * * * *